United States Patent
Subramaniyan et al.

(10) Patent No.: US 10,438,126 B2
(45) Date of Patent: Oct. 8, 2019

(54) SYSTEMS AND METHODS FOR DATA ESTIMATION AND FORECASTING

(71) Applicant: General Electric Company, Schenectady, NY (US)

(72) Inventors: Arun Karthi Subramaniyan, Clifton Park, NY (US); Felipe Antonio Chegury Viana, Niskayuna, NY (US); Fabio Nonato de Paula, Niskayuna, NY (US); Natarajan Chennimalai Kumar, Schenectady, NY (US)

(73) Assignee: General Electric Company, Schenectady, NY (US)

(*) Notice: Subject to any disclaimer, the term of this patent is extended or adjusted under 35 U.S.C. 154(b) by 915 days.

(21) Appl. No.: 14/986,211

(22) Filed: Dec. 31, 2015

(65) Prior Publication Data

US 2017/0193381 A1 Jul. 6, 2017

(51) Int. Cl.
*G06N 7/00* (2006.01)
*G06F 17/18* (2006.01)

(52) U.S. Cl.
CPC ............. *G06N 7/005* (2013.01); *G06F 17/18* (2013.01)

(58) Field of Classification Search
CPC ... G06N 7/005; G06F 17/18; G06F 17/30324; Y04S 10/54
USPC .......................................................... 706/52
See application file for complete search history.

(56) References Cited

U.S. PATENT DOCUMENTS 7,472,099 B2  12/2008  Nishiuma et al.
8,386,285 B2   2/2013  Chen et al.
8,768,866 B2   7/2014  Desai
2006/0161403 A1*  7/2006  Jiang .................. G06F 17/18
                                                        703/2
2007/0043656 A1   2/2007  Lancaster
(Continued)

FOREIGN PATENT DOCUMENTS

CN        103678869 A        3/2014

OTHER PUBLICATIONS

Qu J. et al., "Prediction and estimation method of flight parameter missing data", CN103678869, Mar. 26, 2014. (Year: 2014).*
Nyamundanda G. et al., "Probabilistic principal component analysis for metabolomic data", BMC Bioinformatics, 2010. (Year: 2010).*
Oba S. et al., "A Bayesian missing value estimation method for gene expression profile data", Bioinformatics, vol. 19 No. 16 2003, pp. 2088-2096. (Year: 2003).*

(Continued)

*Primary Examiner* — Dave Misir
(74) *Attorney, Agent, or Firm* — Armstrong Teasdale LLP

(57) ABSTRACT

A system for estimating data in large datasets for an equipment system is provided. The system includes a data estimation and forecasting (DEF) computing device. The DEF computing device arranges a dataset in a primary matrix and parses rows of the primary matrix and generates a sample matrix by selecting primary matrix rows having non-null values for each variable. The DEF computing device adds to the sample matrix rows that include non-null values for each variable except one. The DEF computing device generates normalized values for this augmented matrix, applies several techniques including probabilistic principal component analysis (PPCA) and Markov processes, and scales the augmented matrix to normalized values. The DEF computing device generates non-null values for the variable, scales the augmented matrix back to the sample matrix, and generates a forecast for the equipment system, directing a user to update logistics processes for the equipment system.

21 Claims, 8 Drawing Sheets

(56) References Cited

U.S. PATENT DOCUMENTS

| | | | |
|---|---|---|---|
| 2009/0099984 A1* | 4/2009 | Zhu | G06K 9/62 |
| | | | 706/12 |
| 2012/0072173 A1* | 3/2012 | Yuan | G05B 17/02 |
| | | | 702/181 |
| 2013/0226839 A1* | 8/2013 | Archambeau | G06N 3/08 |
| | | | 706/12 |
| 2013/0262013 A1 | 10/2013 | Ide | |
| 2014/0109124 A1 | 4/2014 | Morales et al. | |
| 2014/0280065 A1* | 9/2014 | Cronin | G06F 17/30539 |
| | | | 707/722 |
| 2014/0280066 A1* | 9/2014 | Petschulat | G06F 17/30539 |
| | | | 707/722 |
| 2014/0280191 A1* | 9/2014 | Cronin | G06F 17/30539 |
| | | | 707/741 |
| 2015/0100368 A1 | 4/2015 | Blomberg et al. | |
| 2015/0120263 A1 | 4/2015 | Brzezicki et al. | |

OTHER PUBLICATIONS

Yu L. et al., "Probabilistic principal component analysis with expectation maximization (PPCA-EM) facilitates volume classification and estimates the missing data", Journal of Structural Biology 171 (2010) 18-30. (Year: 2010).*

Ilin A.. et al., "Practical Approaches to Principal Component Analysis in the Presence of Missing Values", Journal of Machine Learning Research 11 (2010) 1957-2000. (Year: 2010).*

Li I. et al., "Efficient missing data imputing for traffic flow by considering temporal and spatial dependence", Transportation Research Part C 34 (2013) 108-120. (Year: 2013).*

Li Y. et al., "Missing traffic data: comparison of imputation methods", IET Intell. Transp. Syst., 2014, vol. 8, Iss. 1, pp. 51-57. (Year: 2014).*

Fung,"Methods for the Estimation of Missing Values in Time Series", Faculty of Communications, Health and Science Edith Cowan University Perth, Western Australia, pp. 1-202, 2006.

* cited by examiner

SYSTEMS AND METHODS FOR DATA ESTIMATION AND FORECASTING

BACKGROUND

The field of the disclosure relates generally to methods for predicting unknown or missing data in a large dataset, and forecasting future data points for the dataset. More specifically, the present disclosure relates to systems and methods to detect and populate blank/null data points in a dataset, and further extrapolate from the dataset without the use of massive computing capacity.

In large distributed systems, such as industrial systems, accurately measuring the behavior of equipment is critical. For several activities such as design improvements, performance management, and condition-based maintenance, it is vital that there be consistent monitoring of the equipment leading to a robust and complete record of events (e.g., in the form of a dataset). Moreover, having an accurate complete operational history is essential for predicting future equipment behavior. In practice, operational data is seldom complete and is often missing in large quantities depending on the specific variable of interest, equipment, operator, location, etc. Unfortunately, there are cases where some data entries or even entire rows or columns are missing. This adversely affects the ability to build predictive models and predict/update existing models. Missing data arises frequently where, for example, a timestamp exists for a particular event but event data is not available, or where event data is available but there is no timestamp, preventing a user from properly placing the event timeline. Known methods are also limited in that, frequently, specific variables cannot be estimated in isolation. Moreover, known methods are unable to predict future data for an equipment system without at least some a priori knowledge of the past behavior of the equipment.

BRIEF DESCRIPTION

In one aspect, a system for estimating and forecasting data in a large dataset for an equipment system is provided. The system includes a memory device, a user interface including a display device, and a data estimation and forecasting (DEF) computing device that is in communication with the memory device and communicatively coupled to the user interface. The DEF computing device is configured to receive, from the user interface, a dataset including first data for a plurality of variables corresponding to observed behavior in the equipment system, the dataset further including a selection of a variable from the plurality of variables, where second data for the selected variable is missing. The DEF computing device is also configured to arrange the first data in a primary matrix including a first plurality of rows, where a first dimension of the primary matrix is assigned to at least one label of the plurality of variables and a second dimension of the primary matrix is assigned to at least one value of the plurality of variables. The DEF computing device is further configured to parse each row of the primary matrix. The DEF computing device is also configured to generate a sample matrix including a random selection of a second plurality of rows of the matrix, where each row of the second plurality of rows includes a non-null value for each variable of the plurality of variables. The DEF computing device is further configured to generate an augmented matrix by adding at least one additional row to the sample matrix, where the additional rows include non-null values for each variable of the plurality of variables with the exception of the selected variable. The DEF computing device is also configured to generate one or more normalized values for the augmented matrix. The DEF computing device is further configured to apply principal component analysis to the normalized values of the augmented matrix, including scaling the augmented matrix to the normalized values for the augmented matrix as a function of the first dimension. The DEF computing device is also configured to generate non-null values for the selected variable. The DEF computing device is further configured to scale the augmented matrix back to the sample matrix. The DEF computing device is also configured to generate a forecast for the equipment system, causing it to be displayed on the display device and directing a user of the equipment system to update a logistics process for the equipment system.

In another aspect, method for estimating and forecasting data in a large dataset for an equipment system is provided. The method is implemented using a data estimation and forecasting (DEF) computing device in communication with a memory device and a processor. The method includes the step of receiving, from the user interface, a dataset including first data for a plurality of variables corresponding to observed behavior in the equipment system, the dataset further including a selection of a variable from the plurality of variables, where second data for the selected variable is missing. The method also includes the step of arranging the first data for the plurality of variables in a primary matrix including a first plurality of rows, where a first dimension of the primary matrix is assigned to at least one label of the plurality of variables and a second dimension of the primary matrix is assigned to at least one value of the plurality of variables. The method further includes the step of parsing each row of the primary matrix. The method also includes the step of generating a sample matrix including a random selection of a second plurality of rows of the matrix, where each row of the second plurality of rows includes a non-null value for each variable of the plurality of variables. The method further includes the step of generating an augmented matrix by adding at least one additional row to the sample matrix, where the additional rows include non-null values for each variable of the plurality of variables with the exception of the selected variable. The method also includes the step of generating normalized values for the augmented matrix. The method further includes the step of applying principal component analysis to the normalized values of the augmented matrix, including scaling the augmented matrix to the normalized values for the augmented matrix as a function of the first dimension. The method also includes the step of generating non-null values for the selected variable. The method further includes the step of scaling the augmented matrix back to the sample matrix. The method also includes the step of generating a forecast for the equipment system, causing it to be displayed on the display device and directing a user of the equipment system to update a logistics process for the equipment system.

In yet another aspect, a computer readable medium having computer-executable instructions embodied thereon for estimating and forecasting data in a large dataset for an equipment system is provided. When executed by at least one processor, the computer-executable instructions cause the at least one processor to receive, from the user interface, a dataset including first data for a plurality of variables corresponding to observed behavior in the equipment system, the dataset further including a selection of a variable from the plurality of variables, where second data for the selected variable is missing. The computer-executable instructions also cause the at least one processor to arrange the first data in a primary matrix including a first plurality of rows, where a first dimension of the primary matrix is assigned to at least one label of the plurality of variables and a second dimension of the primary matrix is assigned to at least one value of the plurality of variables. The computer-executable instructions further cause the at least one processor to parse each row of the primary matrix. The computer-executable instructions also cause the at least one processor to generate a sample matrix including a random selection of a second plurality of rows of the matrix, where each row of the second plurality of rows includes a non-null value for each variable of the plurality of variables. The computer-executable instructions further cause the at least one processor to generate an augmented matrix by adding at least one additional row to the sample matrix, where the additional rows include non-null values for each variable of the plurality of variables with the exception of the selected variable. The computer-executable instructions also cause the at least one processor to generate normalized values for the augmented matrix. The computer-executable instructions further cause the at least one processor to apply principal component analysis to the normalized values of the augmented matrix, including scaling the augmented matrix to the normalized values for the augmented matrix as a function of the first dimension. The computer-executable instructions also cause the at least one processor to generate non-null values for the selected variable. The computer-executable instructions further cause the at least one processor to scale the augmented matrix back to the sample matrix. The computer-executable instructions also cause the at least one processor to generate a forecast for the equipment system, causing it to be displayed on the display device and directing a user of the equipment system to update a logistics process for the equipment system.

DRAWINGS

These and other features, aspects, and advantages will become better understood when the following detailed description is read with reference to the accompanying drawings in which like characters represent like parts throughout the drawings, wherein.

Figure 1:
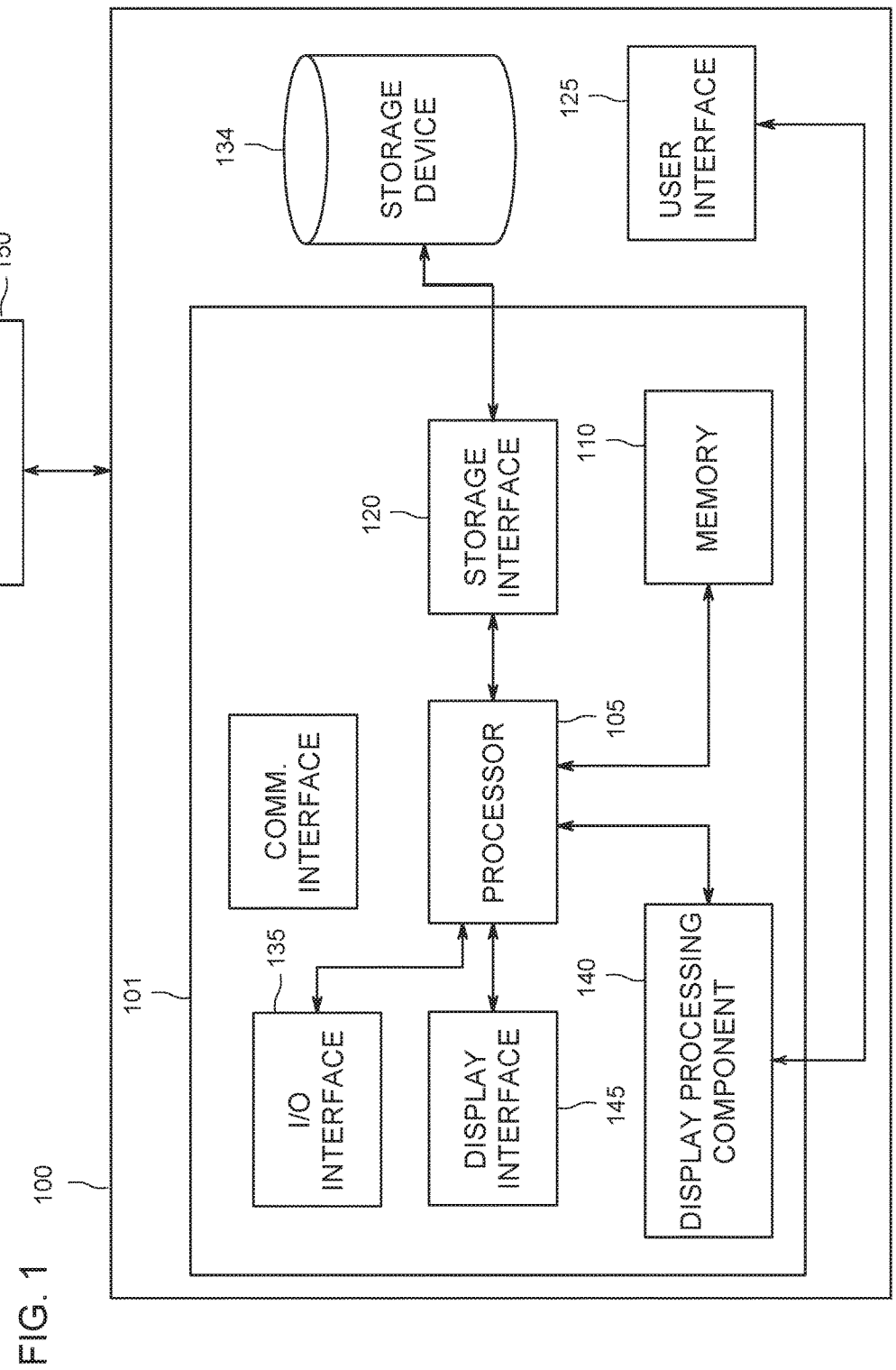
FIG. 1 illustrates an exemplary configuration of a DEF computing device that is used to estimate and predict data for a dataset.

Unless otherwise indicated, the drawings provided herein are meant to illustrate features of embodiments of the disclosure. These features are believed to be applicable in a wide variety of systems including one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the terms "software" and "firmware" are interchangeable, and include any computer program stored in memory for execution by devices that include, without limitation, mobile devices, clusters, personal computers, workstations, clients, and servers.

Computer systems, such as the data estimation and forecasting computing device are described, and such computer systems include a processor and a memory. However, any processor in a computer device referred to herein may also refer to one or more processors where the processor may be in one computing device or a plurality of computing devices acting in parallel. Additionally, any memory in a computer device referred to may also refer to one or more memories, where the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor." The term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above are only examples, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The present disclosure relates to a Data Estimation and Forecasting (DEF) computing device that is, in at least some implementations, used to generate missing and future data with respect to an equipment system. As noted above, industrial datasets may have gaps in the form of individual data points, time entries with no corresponding data points, or entirely missing rows or columns. The DEF computing device is configured to estimate missing data points using the existing dataset, and provide estimated data points to complete the dataset. The DEF computing device is also configured to predict future values for variables within the dataset, using existing data points.

The DEF computing device uses a variety of techniques, alone or in combination, to estimate missing data. The techniques used include, without limitation, probabilistic principal component analysis (PPCA), Markov Process modeling, use of correlated distributions (bootstrapping), metamodeling, (e.g., automated neural networks, regression, and support vector machines), physics-based correlational modeling, time-series analysis, and the like.

PPCA is one example of technique employed by the DEF computing device to estimate missing data. The main result of a probabilistic principal component analysis of a dataset is a q-dimensional linear projection of a d-dimensional set of data into a principal component space, such that the variance within the dataset is maximized. The d by d transformation matrix W is composed by the ordered eigenvectors of the sample covariance matrix, arranged in a decreasing order, according to corresponding eigenvalues. The principal component coefficients are then obtained using equation 1:

$$x''=W^T(t_n-\bar{t}),\qquad\text{(Eq. 1)}$$

where $t_n$ is a d-dimensional observed data vector, $\bar{t}$ is the data sample mean and $x''$ is the principal component vector of $t_n$ in the projected space. Dimensionality reduction is obtained by selecting the q first eigenvectors in W and truncating the matrix to a d by q shape, so that the projection $x''$ is q-dimensional. As the transformation is based solely on the decomposition of the sample covariance matrix, there are no probabilistic models associated with the observed data. T represents the transpose of the matrix.

The inverse transformation as shown in equation 2 below is used to reconstruct $t_n$:

$$\hat{t}_n=Wx_n+\bar{t}.\qquad\text{(Eq. 2)}$$

In the probabilistic version of PCA (PPCA), an isotropic Gaussian error $\varepsilon\sim N(0,\Psi)$ is introduced to the inverse transformation. The observed data reconstruction then becomes:

$$t=Wx_n+\varepsilon+\mu,\qquad\text{(Eq. 3)}$$

where the vector $\mu$ provides a nonzero mean to the observed data and the observations become $t\sim N(\mu,WW^T+\Psi)$. As no closed-form solution is available for obtaining W and $\Psi$, an iterative procedure is required. These variables can be estimated through an Expectation-Maximization (EM) model. The EM model used is any iterative method for finding maximum likelihood or maximum a posteriori (MAP) estimates of variables that is dependent on unobserved variables. An EM iteration alternates between performing an expectation (E) step, which creates a function for the expectation of the log-likelihood evaluated using the current estimate for the parameters, and a maximization (M) step, which computes parameters maximizing the expected log-likelihood found on the E step. These parameter-estimates are then used to determine the distribution of the latent variables in the next E step.

The first step towards enabling missing data handling is rewriting equation 3 in its element-wise form. The element-wise reconstruction of the observed data is:

$$w_i^T x_j+m_i+\varepsilon_{ij},\qquad\text{(Eq. 4)}$$

where i and j represent the indexes of the observed matrix, $w_i$ and $x_j$ are column vectors taken from the coefficient and the components matrixes respectively, $m_i$ is the variable average and $\varepsilon_{ij}$ is the element error or noise. With this formulation, all auxiliary quantities calculated during the EM iterations are evaluated only at observed values, which enables excluding un-observed, or missing, data. The EM iterations result in the most likely coefficient matrix W and variance, which are used to reconstruct the complete dataset through equation 4. The final reconstructed matrix provides the most likely estimation of the missing values on the original matrix.

The DEF computing device is configured to receive a dataset from a user computing device where the user operating the user computing device wishes to learn whether the dataset contains missing data. The dataset will include data for a plurality of variables corresponding to observed behavior in the equipment system. The DEF computing device is configured to also receive a selection of a variable of the plurality of variables. On receiving these two items, the DEF computing device arranges the data for the plurality of variables in a two-dimensional full-data matrix. This matrix arranges the data where the columns correspond to the variables and the rows correspond to the values of the variables. As noted, some of these rows will have missing values for certain variables, whereas other rows will be complete. The DEF computing device generates a sample matrix from the full-data matrix. The sample matrix includes a random selection of complete rows, i.e., each row has a non-null value for each variable. Generating the sample matrix further involves parsing or traversing each row of the two-dimensional matrix in order to filter out the complete rows.

After creating the sample matrix, the DEF computing device is configured to generate an augmented matrix by appending a predefined number of additional rows to the sample matrix. However, the additional rows are distinct in that each of these additional rows will have complete data for each variable with the exception of the selected variable (deemed to have missing data by the user). The additional rows contain non-null values for each of the plurality of variables with the exception of the selected variable. The DEF computing device is configured to apply principal component analysis to normalized values for the selected variable. In other implementations, the DEF computing device applies probabilistic principal component analysis. This includes also scaling the augmented matrix to a normalized values for the augmented matrix by the columns, i.e., by the variables, and generating non-null values for the selected variable that had missing data. The PCA, PPCA or other algorithms generates non-null values based on the rows with complete data. Furthermore, the DEF computing device is configured to scale the augmented matrix (now with non-null values for the selected variable) back to the sample matrix. This includes updating the value for the selected variable to be the non-null values generated from the principal component analysis. The DEF computing device outputs the sample matrix with non-null values for the selected variable to the user. This process can be repeated by sampling other rows of the dataset until the complete dataset has non-null values for the selected variable.

Additionally, the DEF computing device is also configured to generate a forecast for the equipment system, causing it to be displayed on the display device and enabling a user of the equipment system to update a logistics process for the equipment system. This is done by generating a sample matrix as above, except the additional rows will contain non-null values for only the time variables, whereas values for all the other variables are null by definition (since this is for future forecasting).

FIG. 1 illustrates an exemplary configuration of a DEF computing device 101, such as the DEF computing device discussed above. In one embodiment, DEF computing device 101 is part of a system 100 that is used to estimate and forecast missing data for an equipment system 150. System 100 also includes a storage interface 134, and a user interface 125. User interface 125 may be used by an operator to view datasets for equipment 150 and review whether data is missing. DEF computing device 101 includes a processor 105, e.g., a central processing unit (CPU) of a computer for executing instructions. Instructions may be stored in a memory area 110, for example. Processor 105 may include one or more processing units, e.g., in a multi-core configuration, for executing instructions. The instructions may be executed within a variety of different operating systems on the DEF computing device 101, such as UNIX, LINUX, Microsoft Windows®, etc. More specifically, the instructions may cause various data manipulations on data stored in storage device 134, e.g., and without limitation, create, read, update, and delete procedures. It should also be appreciated that upon initiation of a computer-based method, various instructions may be executed during initialization. Some operations may be required in order to perform one or more processes described herein, while other operations may be more general and/or specific to a particular programming language e.g., and without limitation, C, C#, C++, Java, Python, JavaScript, Matlab, Julia or other suitable programming languages, etc.

Processor 105 is operatively coupled to a communication interface 115 such that DEF computing device 101 is capable of communicating with a remote device such as a remote user system or another DEF computing device 101. For example, communication interface 115 may receive communications from user computing devices via the Internet. Processor 105 is also operatively coupled to a input/output interface 135 that connects to one or more input/output devices used by a user to control operation of DEF computing device 101. Input/output devices may include, without limitation, one or more of a keyboard, mouse, microphone, touchpad, keypad, stylus, speakers, or any device configured to provide user input to a human user and transmit output. Processor 105 is also operatively coupled to a display processing component 140 and a display interface 145.

In one embodiment, display processing component 140 is a dedicated computer processor for image processing and rendering tasks, e.g., and without limitation, a graphics processing pipeline. Display interface 145 represents any display device used to render images for viewing by user, including, and without limitation, computer monitors, mobile device screens, touch-enabled screens, LCD displays, TFT displays, dot-matrix displays, and the like. Processor 105 is configured to send some or all of its image processing tasks to display processing component 140, receive processed images to display processing component 140, and display the processed images via display interface 145 to a user.

Processor 105 may also be operatively coupled to a storage device 134. Storage device 134 is any computer-operated hardware suitable for storing and/or retrieving data. In some embodiments, storage device 134 is integrated in DEF computing device 101. In other embodiments, storage device 134 is external to DEF computing device 101 and is similar to database 120 (shown in FIG. 1). For example, DEF computing device 101 may include one or more hard disk drives as storage device 134. In other embodiments, storage device 134 is external to DEF computing device 101 and may be accessed by a plurality of server systems 101. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 105 is operatively coupled to storage device 134 via a storage interface 120. Storage interface 120 is any component capable of providing processor 105 with access to storage device 134. Storage interface 120 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 105 with access to storage device 134.

Memory area 110 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 2:
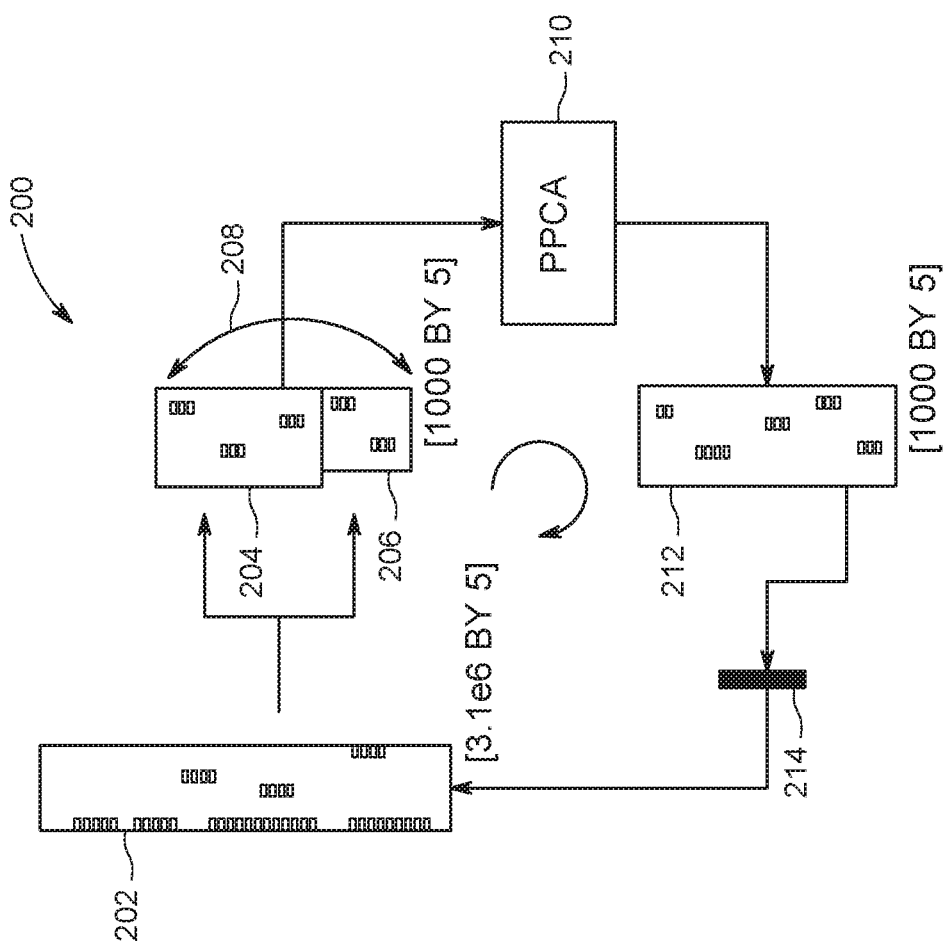
FIG. 2 is an exemplary process flow showing how the DEF computing device estimates missing data within a given dataset.

FIG. 2 is an exemplary process flow 200 showing how DEF computing device 101 (shown in FIG. 1) estimates missing data within a given dataset. The example of an aircraft engine (not shown) will be used to illustrate the process flow. DEF computing device 101 is configured to receive a dataset of aircraft engine data and arrange it into a matrix 202. Matrix 202 is a n×m matrix of all available data, with m columns for variables within the dataset, e.g., and without limitation, engine core temperature level, ambient temperature, engine rotation speed, atmospheric aerosol levels, and the like. Matrix 202 contains n rows, with each row representing a timestamp or snapshot in time. For example, row 1 may contain values for each of the n columns for Jan. 1, 2015, row 2 may contain values for each of the n columns for Jan. 2, 2015, continuing until row n, which may contain values for each of the n columns for Dec. 31, 2015, and the like. In one embodiment, n=3.1*10$^6$ rows and m=5 columns for matrix 202.

Similar to matrix 202, matrix 204 is an a×m matrix, in this case a 900×5 matrix. Matrix 204 is composed of rows that are randomly selected from matrix 202. Each row in matrix 204 is selected so that it has complete data for each column. In other words, the a rows do not contain any missing data. Any number of random and pseudo-random number generation algorithms can be used, including, but not limited to, linear congruential generators, the Mersenne Twister algorithm, or the like. DEF computing device 101 is configured to randomly select a rows, e.g., 900 rows, from matrix 202, where a<n and each of rows 1 through row a contains a non-null value for each of its columns 1-m. DEF computing device 101 stores the selection of a rows as matrix 204.

Certain cells, certain rows, or even certain columns in matrix 202 may contain missing data, e.g., and without limitation, in the form of null values or corrupted values. Similar to matrix 204, matrix 206 is a b×m matrix, composed of rows from matrix 202. For matrix 206, b is a predetermined, non-negative number of rows, such as 100, and m remains 5 as in matrix 202. However, each of the b rows from matrix 202 selected to create matrix 206 are selected on the basis that they contain no data for a specific, predetermined column. For example, column 1 in matrix 206 (or some predetermined column 1-m) is completely blank, i.e., missing data. Column 1 may represent ambient temperature, i.e., the air temperature when the aircraft engine was operating was not recorded mid-flight or has been otherwise lost.

DEF computing device 101 is configured to append matrix 206 to matrix 204 of rows taken from matrix 202. Appending matrix 206 to matrix 204 results in a 1000×5 combined matrix 208.

In one embodiment, DEF computing device 101 is configured to scale matrix 208 column-wise to each normalized variable. Variables in matrix 208 may be normalized by z-score, maximum value, minimum value, and the like. DEF computing device 101 is configured to process matrix 208 after normalization using PPCA process 210, using the PPCA techniques discussed above. PPCA process 210 generates non-null values 214 for column 1 in matrix 206. DEF computing device 101 is configured to scale an output matrix 212 from PPCA process 210, i.e., matrix 208 but now with non-null values 214 for the variable in column 1, back to an n×m space. This includes updating the value for the column 1 variable to be non-null values 214 generated from PPCA process 210.

In at least some implementations, process flow 200 is repeated again using matrix 202 but excluding rows that have been filled in using non-null values 214 from PPCA process 210. Process flow 200 is repeated until all missing rows have been filled in with one or more non-null values.

Figure 3:
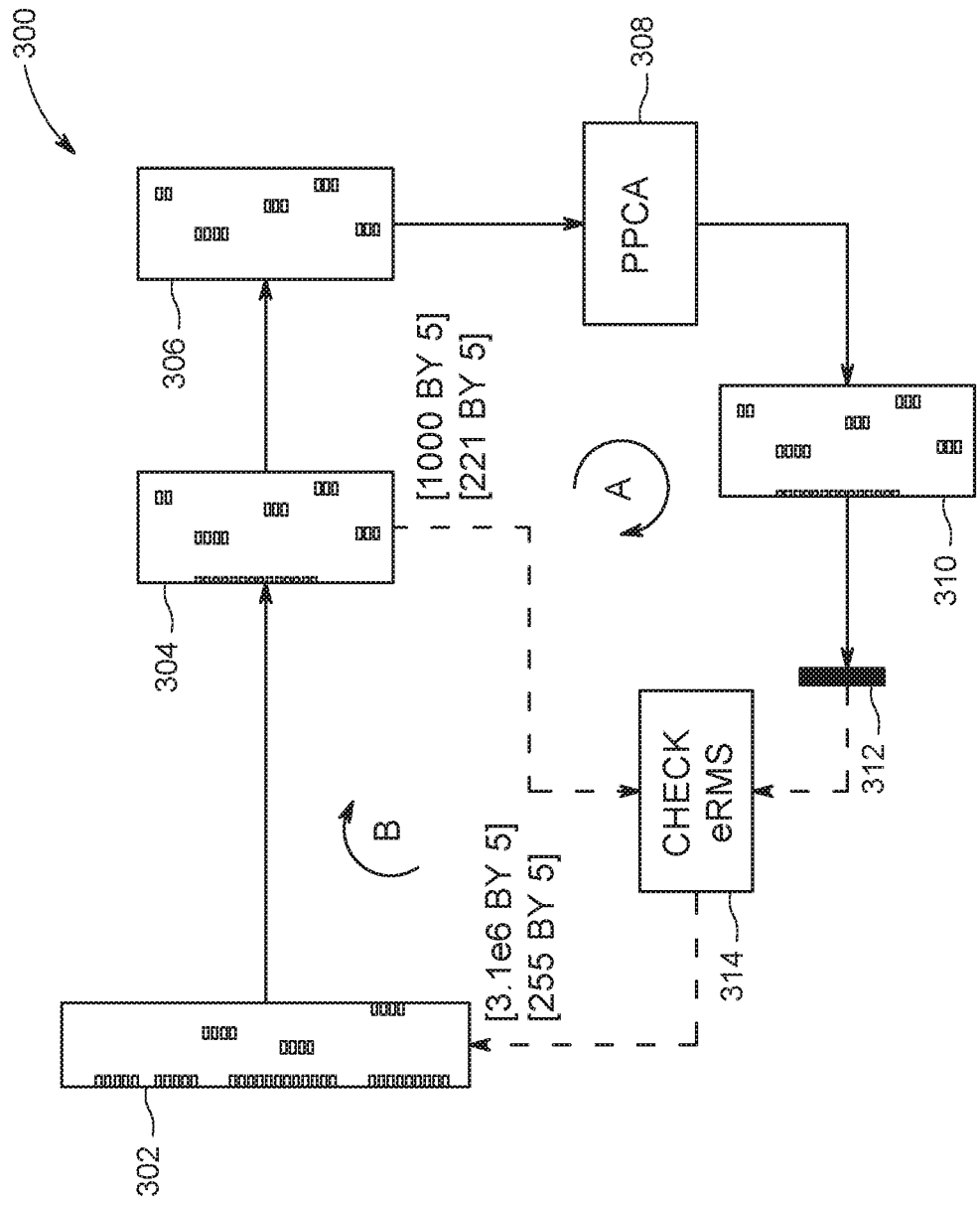
FIG. 3 is an exemplary process flow showing how the DEF computing device validates the missing data estimation process flow of FIG. 2 and determines to what degree the estimated data generated in FIG. 2 errs compared to actually observed data.

FIG. 3 is an exemplary process flow 300 showing how DEF computing device 101 (shown in FIG. 1) validates the missing data estimation process flow of FIG. 2 and determines to what degree the estimated data generated in FIG. 2 is not as consistent as compared to actually observed data. The example of an aircraft engine is again used to illustrate the process flow. DEF computing device 101 is configured to receive a dataset of aircraft engine data and arrange it into a matrix 302. Matrix 302 is a n×m matrix of all available data, with m columns for variables within the dataset, e.g., and without limitation, engine core temperature level, ambient temperature, engine rotation speed, atmospheric aerosol levels, and the like. Matrix 302 contains n rows, with each row representing a timestamp or snapshot in time. For example, row 1 may contain values for each of the n columns for Jan. 1, 2015, row 2 may contain values for each of then columns for Jan. 2, 2015, continuing until row n, which may contain values for each of the n columns for Dec. 31, 2015, and the like. In one embodiment, n=3.1*10$^6$ rows and m=5 columns for matrix 202.

Matrix 302 is a matrix that is generated once iterations of process flow 200 (shown in FIG. 2) have completed, e.g., when all missing data has been filled with non-null values from PPCA process 210 (shown in FIG. 2). Matrix 302 contains no missing data. However, the non-null values from PPCA process 210 are estimated and are validated using process flow 300.

DEF computing device 101 is configured to select a random selection of a matrix 304 from matrix 302. Matrix 304 contains a rows, e.g., 1000 rows, from matrix 302, where a<n. DEF computing device 101 stores the selection of a rows as a a×m matrix, in this case 1000×5 matrix 304. DEF computing device 101 is configured to remove a predetermined portion of values, e.g., a certain percentage, a certain fraction, or preset row numbers, for a specific column from matrix 304. For example, DEF computing device 101 removes 10%, or 100 values for column 1 of matrix 304, and generates matrix 306. Matrix 306 is similar to matrix 304 but with the 100 values for column 1 synthetically removed. Matrix 306 may also be referred to as a synthetic matrix, i.e., the values of the matrix have been altered by artificial methods, e.g., to removing an entire row of data, or replacing data with null values. For example, a matrix transformation Additionally, DEF computing device 101 is configured to scale matrix 306 column-wise to each normalized variable. Variables in matrix 306 may be normalized by z-score, maximum value, minimum value, and the like.

DEF computing device 101 is configured to estimate the synthetically removed values using PPCA process 308. PPCA process 308 generates non-null values for column 1 of matrix 306 using the PPCA techniques described above. DEF computing device 101 is configured to fill the non-null values generated by PPCA process 308 back into column 1 for matrix 306, thereby reconstructing matrix 306 and generating an updated matrix 310. DEF computing device 101 is configured to scale matrix 310 back to an n×m space. DEF computing device 101 is configured to evaluate the root-mean-square (RMS) error 314 for matrix 310 compared to matrix 302. Process flow 300 is repeated for all rows in matrix 302 until RMS 314 is determined for the entire dataset. RMS 314 gives a measure of deviation for matrix 310 compared to matrix 304, i.e., a reconstructed version of matrix 304 from which a percentage of values were synthetically removed.

Figure 4:
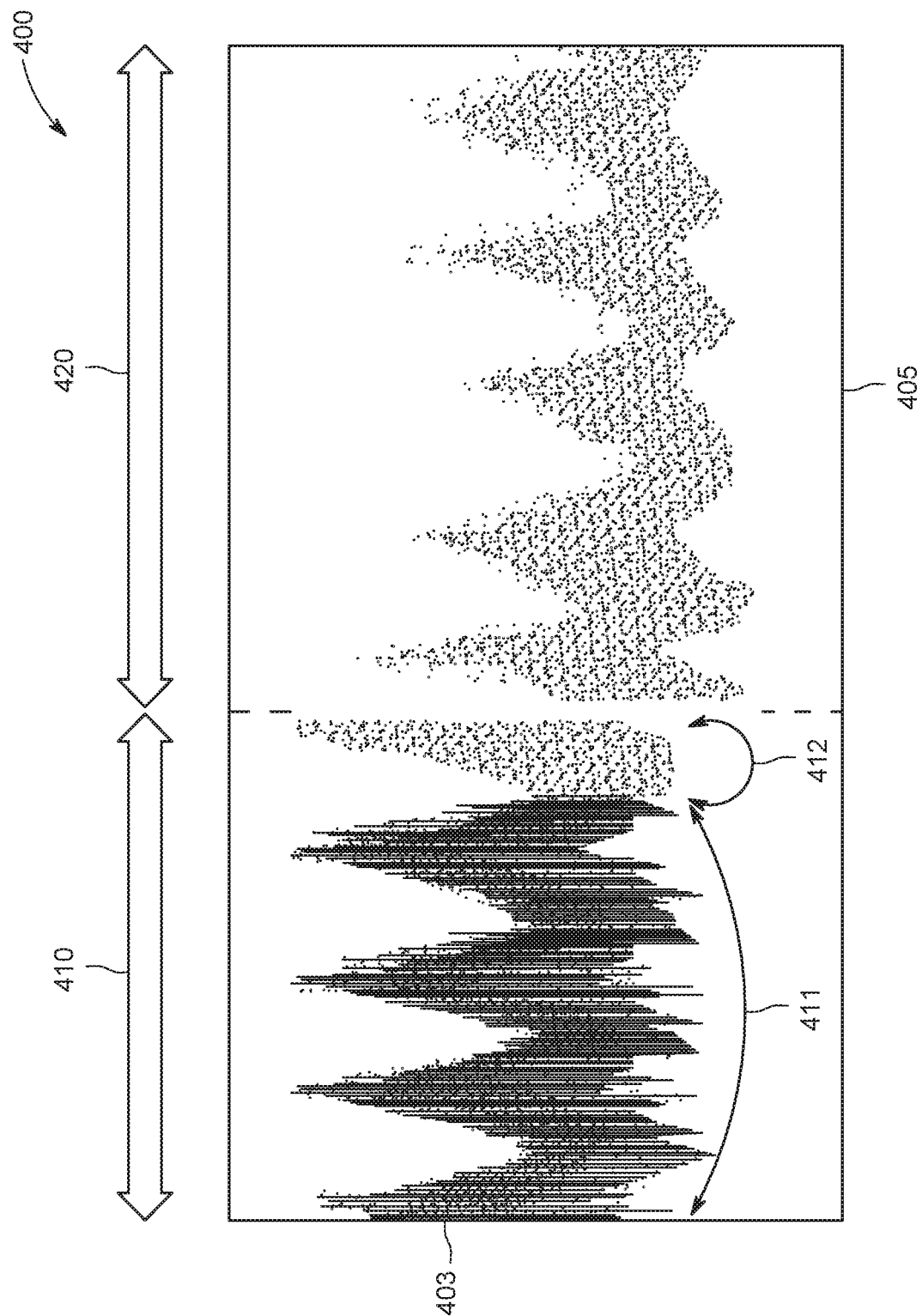
FIG. 4 is a graph showing how the DEF computing device can predict data for a component with no data, using partially reconstructed datasets from similar components.

FIG. 4 is a graph 400 showing how DEF computing device 101 (shown in FIG. 1) predicts data for a component with no data, using partially reconstructed datasets from similar components. For illustration purposes, graph 400 is a representation of engine core temperature plotted against time for two different engines. Graph 400 includes a unitless y-axis 403 representing engine core temperature and a unitless x-axis 405 showing time elapsed in hours. Region 410 of graph 400 shows engine core temperature data for a particular engine A for which partial temperature data is available. More specifically, span 411 of region 410 displays recorded data points, i.e., engine core temperature was available for engine A for that time period. Span 412 displays predicted data points, i.e., data points for engine core temperature that were filled in by processing the data points from span 411 using process flow 200 (shown in FIG. 2).

Region 420 displays predicted data points 416 for an engine B. In one embodiment, engine B is of similar design to engine A and is similar in operational usage compared to engine A, e.g., both engines may operate for long haul flights only, or in relatively hot conditions only, and the like. However, no data is available for engine B. DEF computing device 101 is configured to use the partially reconstructed data for engine A and other engines like A and B and generate a dataset for engine B for a similar time span. As shown in FIG. 4, DEF computing device 101 generates data points for engine B in region 420 for engine core temperature at an earlier time compared to the partially reconstructed data for engine A in region 410. This enables an operator of DEF computing device 101 to determine what the engine core temperature likely would have been for engine B, even without any actual recorded data for engine B.

Figure 5:
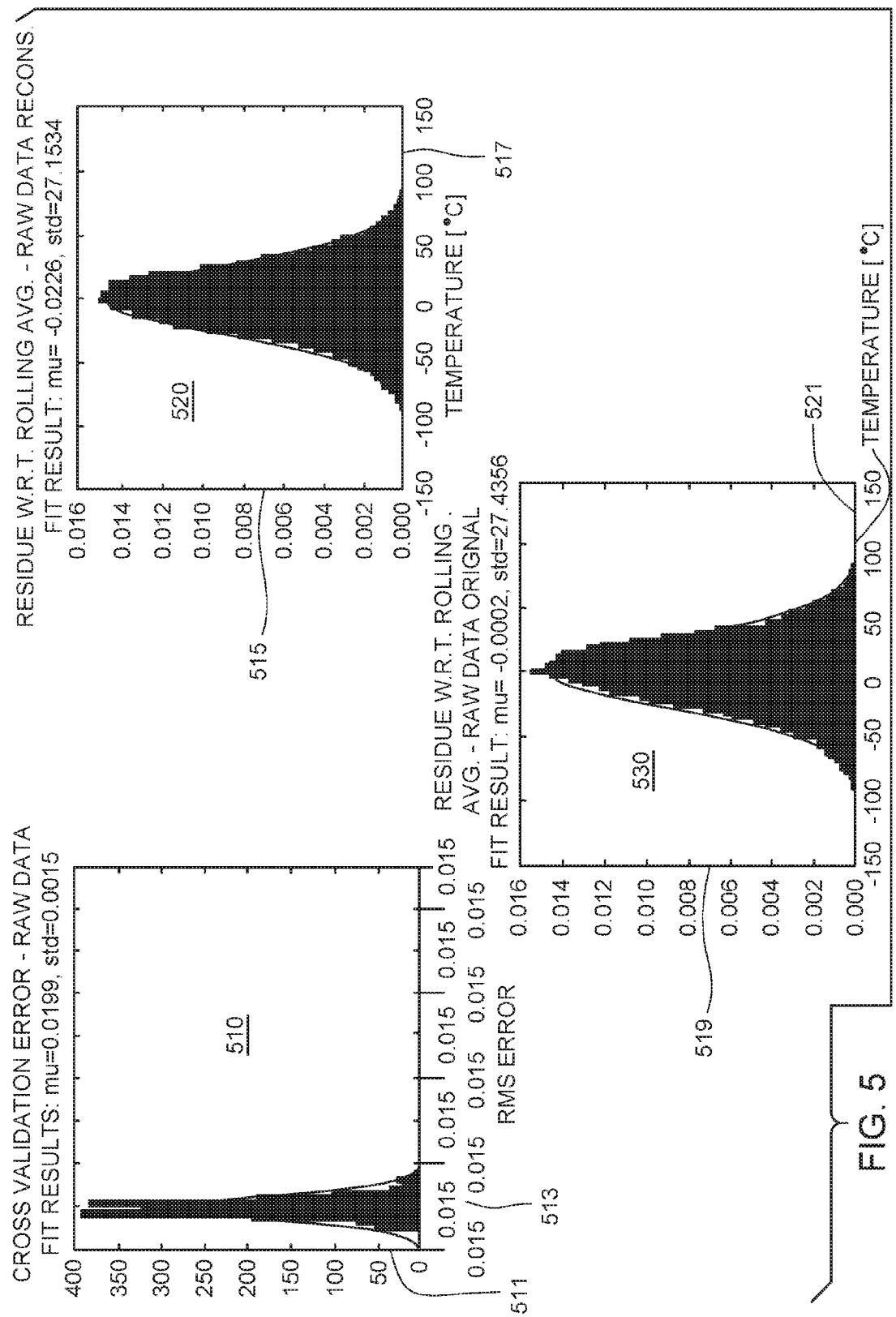
FIG. 5 is a set of graphs showing how the DEF computing device determines an amount of error in estimating missing data and forecasting future data.

FIG. 5 is a set of graphs showing how DEF computing device 101 (shown in FIG. 1) determines an amount of error in estimating missing data and forecasting future data. Graph 510 shows RMS error for data estimation and forecasting processes performed by DEF computing device 101. In one embodiment, graph 510 pertains to process flow 200 (shown in FIG. 2). Graph 510 shows a unitless y-axis 511 representing a number of iterations of process flow 200, e.g., 150 iterations, 200 iterations, and the like. Graph 510 also shows a unitless x-axis 513 representing an RMS error value charted by the number of iterations that evidenced a particular degree of RMS error. For example, graph 510 shows that for close to 400 iterations, i.e., the peaks near the middle of graph 510, the RMS error was about 0.02, or 2%.

Graph 520 is a plot of reconstructed temperature values against RMS error values (sometimes also called residuals or residue) with respect to a rolling average of temperature values. Graph 530 represents the difference between the rolling average of the original data with the instantaneous value of the original data. This shows that the error induced due to estimation is of the same order of variance as the variation in the original dataset itself (~27 F). This proves that the estimation does not induce any additional errors and bears a strong fidelity to the original dataset.

Figure 6A:
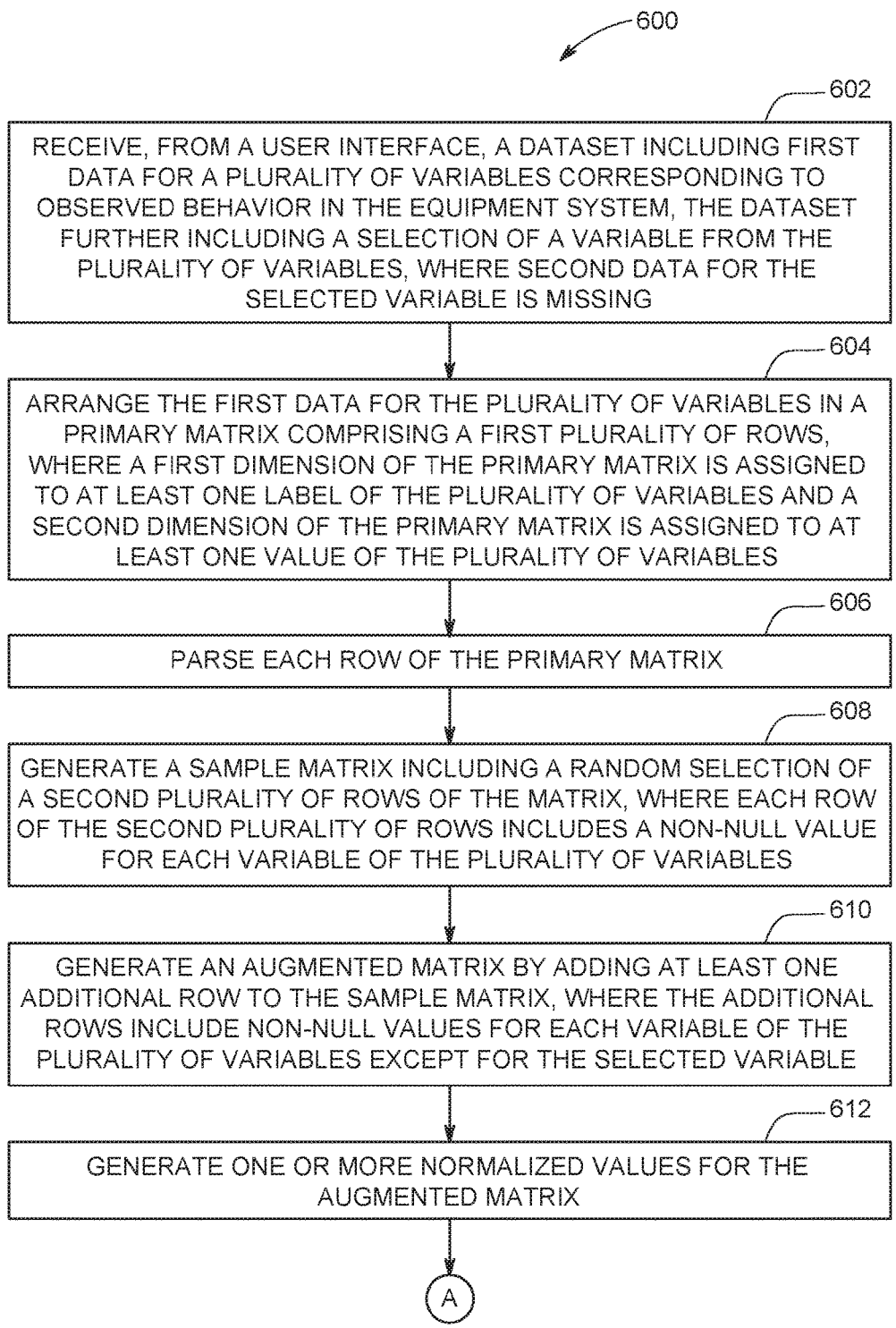
FIGS. 6A and 6B show an exemplary method by which the DEF computing device estimates missing data and forecasts future data.
Figure 6B:
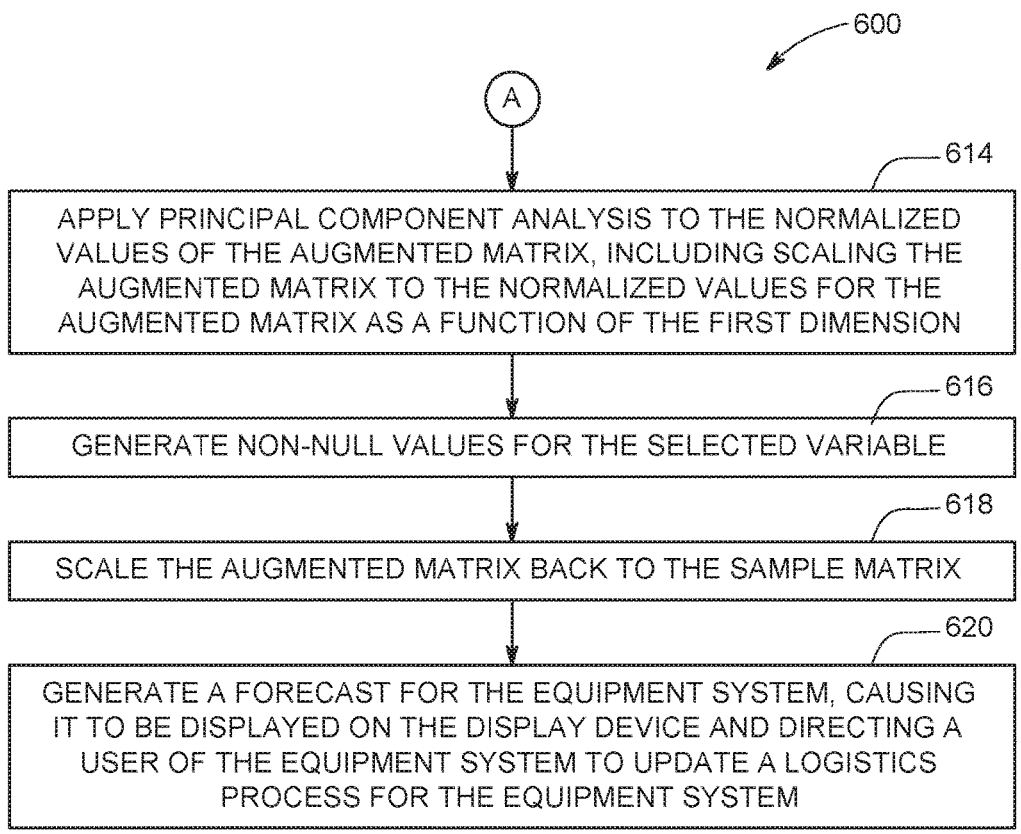

FIGS. 6A and 6B show an exemplary method 600 by which DEF computing device 101 (shown in FIG. 1) estimates missing data and forecasts future data. DEF computing device 101 receives 602, from a user interface, a dataset including first data for a plurality of variables corresponding to observed behavior in the equipment system. The dataset includes a selection of a variable from the plurality of variables, where second data for the selected variable is missing. DEF computing device 101 arranges 604 the first data for the plurality of variables in a primary matrix including a first plurality of rows, where a first dimension of the primary matrix is assigned to at least one label of the plurality of variables and a second dimension of the primary matrix is assigned to at least one value of the plurality of variables. DEF computing device 101 parses 606 each row of the primary matrix. DEF computing device 101 generates 608 a sample matrix including a random selection of a second plurality of rows of the matrix, where each row of the second plurality of rows includes a non-null value for each variable of the plurality of variables.

DEF computing device 101 generates 610 an augmented matrix by adding at least one additional row to the sample matrix, where the additional rows include non-null values for each variable of the plurality of variables with the exception of the selected variable. DEF computing device 101 generates 612 one or more normalized values for the augmented matrix. DEF computing device 101 applies 614 principal component analysis to the normalized values of the augmented matrix, including scaling the augmented matrix to the normalized values for the augmented matrix as a function of the first dimension. DEF computing device 101 generates 616 non-null values for the selected variable. DEF computing device 101 scales 618 the augmented matrix back to the sample matrix. As a final step, DEF computing device 101 generates 620 a forecast for the equipment system, causing it to be displayed on the display device and directing a user of the equipment system to update a logistics process for the equipment system.

Figure 7:
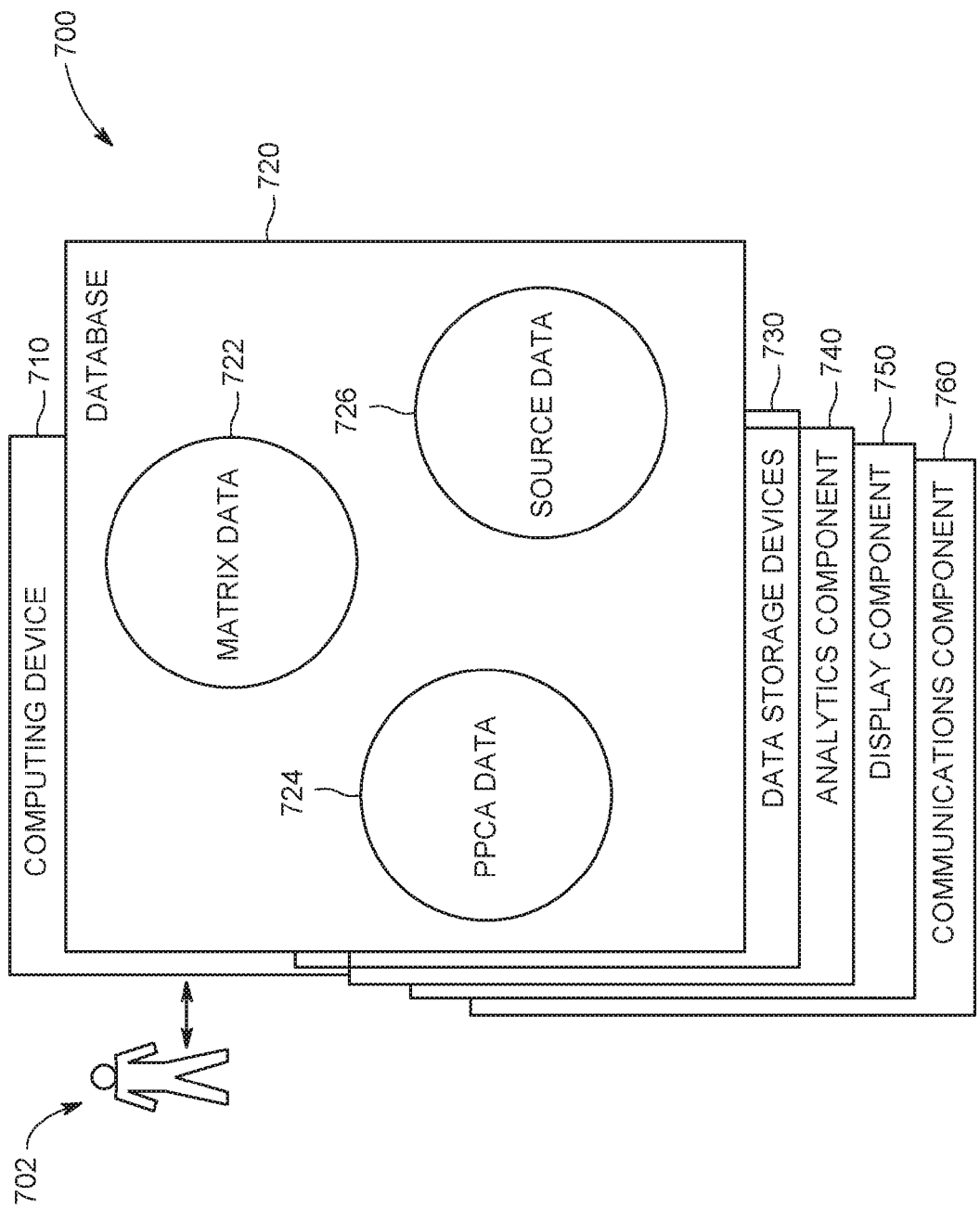
FIG. 7 shows an exemplary configuration of a database within a computing device, along with other related computing components, that may be used to estimate missing data and forecast future data for a dataset.

FIG. 7 shows an exemplary configuration of a database 700 within a computing device, along with other related computing components, that may be used to estimate missing data and forecast future data for a dataset. In some embodiments, computing device 710 is similar to DEF computing device 101 (shown in FIG. 1). User 702 (such as an owner of a component) may access computing device 710 in order to estimate missing data and forecast future data for a dataset. In some embodiments, database 720 is similar to storage device 134 (shown in FIG. 1). In the example embodiment, database 720 includes matrix data 722, PPCA data 724, and source data 726. Matrix data 722 includes stored matrices such as matrix 302 in FIG. 2 or matrix 302 in FIG. 3, and the like. Matrix data 722 stores incoming data in the form of n×m matrices, where n is the number of matrix columns and m is the number of matrix rows. PPCA data 724 includes data regarding PPCA operations performed on matrix data 722, such as those performed during PPCA process 210 or PPCA process 308 and the like. Source data 726 includes datasets stored in the form in which they are received by the DEF computing device 101. For example, source data 726 may be composed of aircraft engine data, industrial component data, and the like, and may be in different formats, e.g., array, hash table, relational database, and the like.

Computing device 710 also includes data storage devices 730. Computing device 710 also includes analytics component 740 that processes incoming source data 726, e.g., by converting it into matrix data 722 and processing further to estimate missing data and predict future data for the dataset. Computing device 710 also includes display component 750 that displays visual representations of missing and forecasted data. Computing device 710 also includes communications component 760 which is used to communicate with user computing devices using predefined network protocols such as TCP/IP (Transmission Control Protocol/Internet Protocol) over the Internet.

The methods and systems described herein may be implemented using computer programming or engineering techniques including computer software, firmware, hardware, or any combination or subset thereof, where the technical effects may be achieved by performing at least one of the following steps: (a) receiving, from a user interface, a dataset including first data for a plurality of variables corresponding to observed behavior in the equipment system, the dataset further including a selection of a variable from the plurality of variables, where second data for the selected variable is missing, (b) arranging the first data for the plurality of variables in a primary matrix including a first plurality of rows, where a first dimension of the primary matrix is assigned to at least one label of the plurality of variables and a second dimension of the primary matrix is assigned to at least one value of the plurality of variables, (c) parsing each row of the primary matrix, (d) generating a sample matrix including a random selection of a second plurality of rows of the matrix, where each row of the second plurality of rows includes a non-null value for each variable of the plurality of variables (e) generating an augmented matrix by adding at least one additional row to the sample matrix, where the additional rows include non-null values for each variable of the plurality of variables with the exception of the selected variable (f) generating one or more normalized values for the augmented matrix, (g) applying principal component analysis to the normalized values for the augmented matrix, including scaling the augmented matrix to the normalized values for the augmented matrix as a function of the first dimension, (h) generating non-null values for the selected variable, (i) scaling the augmented matrix back to the sample matrix, and (j) generating a forecast for the equipment system, causing it to be displayed on the display device and directing a user of the equipment system to update a logistics process for the equipment system.

The above-described data estimation and forecasting systems and methods overcome a number of deficiencies associated with known systems and methods of missing data estimation. Specifically, the above-described systems and methods enable accurate estimation of several different types of missing data, accurate forecasting of data, and an automatic detection of different data points without a priori knowledge. The estimation does not depend on knowledge of the operation of a particular component with missing data. The systems and methods are able to estimate missing data and forecast future data without specific information about all variables of the component. The claimed systems and methods enable key commercial advantages such as building of accurate predictive models for design improvements, performance management, condition-based maintenance, fleet management, customer engagement, and advertising impressions.

An exemplary technical effect of the methods, systems, and apparatus described herein includes at least one of: (i) estimation of missing data for a specific component based on data from other components even if all data in a particular component is missing; (ii) data estimation that does not rely on knowledge of operation of a particular component with missing data; (iii) forecasting of variables out in time based on previous operation; and (iv) a scalable model that can be deployed to large fleets due to computational efficiency.

Exemplary embodiments of data estimation and forecasting computer systems for modeling service life decrease in a component are described above in detail. The data estimation and forecasting computer systems and methods of operating such systems are not limited to the specific embodiments described herein, but rather, components of systems and/or steps of the methods may be utilized independently and separately from other components and/or steps described herein. For example, the systems and methods may also be used in combination with other systems requiring data estimation and forecasting for a component, and are not limited to practice with only the facilities, systems and methods as described herein. Rather, the exemplary embodiment can be implemented and utilized in connection with many other modeling applications that are configured to estimate and forecast missing data for a component.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for estimating and forecasting data in a large dataset for an equipment system, said system comprising:
   a memory device;
   a user interface comprising a display device; and
   a data estimation and forecasting (DEF) computing device that is in communication with said memory device and communicatively coupled to said user interface, wherein said DEF computing device is configured to:
   receive, from said user interface, a dataset including first data for a plurality of variables corresponding to observed behavior in the equipment system, the dataset further including a selection of a variable from the plurality of variables, wherein second data for the selected variable is missing;
   arrange the first data in a primary matrix including a first plurality of rows, wherein a first dimension of the primary matrix is assigned to at least one label of the plurality of variables and a second dimension of the primary matrix is assigned to at least one value of the plurality of variables;
   parse each row of the primary matrix;
   generate a sample matrix including a random selection of a second plurality of rows from the primary matrix, wherein each row of the second plurality of rows includes a non-null value for each variable of the plurality of variables;
   generate an augmented matrix by adding at least one additional row to the sample matrix, wherein the additional rows include non-null values for each variable of the plurality of variables with the exception of the selected variable;
generate one or more normalized values for the augmented matrix;
apply principal component analysis to the normalized values of the augmented matrix, including scaling the augmented matrix to the normalized values for the augmented matrix as a function of the first dimension;
generate non-null values for the selected variable based on the applied principal component analysis;
scale the augmented matrix back to the sample matrix; and
generate a forecast for the equipment system based on the generated non-null values for the selected variable, causing it to be displayed on the display device and directing a user of the equipment system to update a logistics process for the equipment system.

2. The system in accordance with claim 1, wherein, to apply the principal component analysis, said DEF computing device is further configured to apply probabilistic principal component analysis to the normalized values to generate a linear projection of the sample matrix.

3. The system in accordance with claim 2, wherein, to generate the linear projection of the sample matrix, said DEF computing device is further configured to transform the sample matrix using a transformation matrix composed by at least one ordered eigenvector.

4. The system in accordance with claim 1, wherein, to scale the augmented matrix back to the sample matrix, said DEF computing device is further configured to update, for each additional row of the at least one additional row, the value for the selected variable to be the non-null values generated from the principal component analysis.

5. The system in accordance with claim 1, wherein said DEF computing device is further configured to:
receive, from said user interface, a second dataset including data for a second plurality of variables corresponding to observed behavior in the equipment system, the second dataset further including a selection of a second variable of the second plurality of variables, wherein data for the selected second variable is not missing; and
arrange the data for the second plurality of variables in a synthetic matrix.

6. The system in accordance with claim 5, wherein said DEF computing device is further configured to synthetically remove a predetermined number of rows in the synthetic matrix.

7. The system in accordance with claim 1, wherein, to generate the forecast, said DEF computing device is further configured to apply an expectation-maximization algorithm to the non-null values for the selected variable.

8. A method for estimating and forecasting data in a large dataset for an equipment system, said method implemented using a data estimation and forecasting (DEF) computing device in communication with a memory device and a processor, said method comprising:
receiving a dataset including first data for a plurality of variables corresponding to observed behavior in the equipment system, the dataset further including a selection of a variable from the plurality of variables, wherein second data for the selected variable is missing;
arranging the first data for the plurality of variables in a primary matrix including a first plurality of rows, wherein a first dimension of the primary matrix is assigned to at least one label of the plurality of variables and a second dimension of the primary matrix is assigned to at least one value of the plurality of variables;
parsing each row of the primary matrix;
generating a sample matrix including a random selection of a second plurality of rows from the primary matrix, wherein each row of the second plurality of rows includes a non-null value for each variable of the plurality of variables;
generating an augmented matrix by adding at least one additional row to the sample matrix, wherein the additional rows include non-null values for each variable of the plurality of variables with the exception of the selected variable;
generating normalized values for the augmented matrix;
applying principal component analysis to the normalized values of the augmented matrix, including scaling the augmented matrix to the normalized values for the augmented matrix as a function of the first dimension;
generating non-null values for the selected variable based on the applied principal component analysis;
scaling the augmented matrix back to the sample matrix; and
generating a forecast for the equipment system based on the generated non-null values for the selected variable, causing it to be displayed on a display device and directing a user of the equipment system to update a logistics process for the equipment system.

9. The method in accordance with claim 8, wherein applying the principal component analysis further comprises applying probabilistic principal component analysis to the normalized values to generate a linear projection of the sample matrix.

10. The method in accordance with claim 9, wherein generating the linear projection of the sample matrix further comprises transforming the sample matrix using a transformation matrix composed by at least one ordered eigenvector.

11. The method in accordance with claim 8, wherein scaling the augmented matrix back to the sample matrix further comprises updating, for each additional row of the at least one additional row, the value for the selected variable to be the non-null values generated from the principal component analysis.

12. The method in accordance with claim 8 further comprising
receiving a second dataset including data for a second plurality of variables corresponding to observed behavior in the equipment system, the second dataset further including a selection of a second variable of the second plurality of variables, wherein data for the selected second variable is not missing; and
arranging the data for the second plurality of variables in a synthetic matrix.

13. The method in accordance with claim 12 further comprising synthetically removing a predetermined number of rows in the synthetic matrix.

14. The method in accordance with claim 8, wherein generating the forecast further comprises applying an expectation-maximization algorithm to the non-null values for the selected variable.

15. A non-transitory computer readable medium having computer-executable instructions embodied thereon for estimating and forecasting data in a large dataset for an equipment system wherein when executed by at least one processor, the computer-executable instructions cause the at least one processor to:

receive a dataset including first data for a plurality of variables corresponding to observed behavior in the equipment system, the dataset further including a selection of a variable from the plurality of variables, wherein second data for the selected variable is missing;

arrange the first data for the plurality of variables in a primary matrix including a first plurality of rows, wherein a first dimension of the primary matrix is assigned to at least one label of the plurality of variables and a second dimension of the primary matrix is assigned to at least one value of the plurality of variables;

parse each row of the primary matrix;

generate a sample matrix including a random selection of a second plurality of rows from the primary matrix, wherein each row of the second plurality of rows includes a non-null value for each variable of the plurality of variables;

generate an augmented matrix by adding at least one additional row to the sample matrix, wherein the additional rows include non-null values for each variable of the plurality of variables with the exception of the selected variable;

generate normalized values for the augmented matrix;

apply principal component analysis to the normalized values of the augmented matrix, including scaling the augmented matrix to the normalized values for the augmented matrix as a function of the first dimension;

generate non-null values for the selected variable based on the applied principal component analysis;

scale the augmented matrix back to the sample matrix; and generate a forecast for the equipment system based on the generated non-null values for the selected variable, causing it to be displayed on a display device and directing a user of the equipment system to update a logistics process for the equipment system.

16. The non-transitory computer readable medium in accordance with claim 15, wherein, to apply the principal component analysis, the computer-executable instructions further cause the at least one processor to apply probabilistic principal component analysis to the normalized values to generate a linear projection of the sample matrix.

17. The non-transitory computer readable medium in accordance with claim 16, wherein, to generate the linear projection of the sample matrix, the computer-executable instructions further cause the at least one processor to transform the sample matrix using a transformation matrix composed by at least one ordered eigenvector.

18. The non-transitory computer readable medium in accordance with claim 15, wherein, to scale the augmented matrix back to the sample matrix, the computer-executable instructions further cause the at least one processor to update, for each additional row of the at least one additional row, the value for the selected variable to be the non-null values generated from the principal component analysis.

19. The non-transitory computer readable medium in accordance with claim 15, wherein the computer-executable instructions further cause the at least one processor to:

receive a second dataset including data for a second plurality of variables corresponding to observed behavior in the equipment system, the second dataset further including a selection of a second variable of the second plurality of variables, wherein data for the selected second variable is not missing; and arrange the data for the second plurality of variables in a synthetic matrix.

20. The non-transitory computer readable medium in accordance with claim 19, wherein the computer-executable instructions further cause the at least one processor to synthetically remove a predetermined number of rows in the synthetic matrix.

21. The non-transitory computer readable medium in accordance with claim 15, wherein, to generate the forecast, the computer-executable instructions further cause the at least one processor to apply an expectation-maximization algorithm to the non-null values for the selected variable.

* * * * *